United States Patent
Fink et al.

(10) Patent No.: US 6,293,859 B1
(45) Date of Patent: Sep. 25, 2001

(54) ELECTRIC POWER TOOL WITH ROTATABLE HANDLE

(75) Inventors: Manfred Fink, Obersulm; Boris Rudolf, Stuttgart, both of (DE)

(73) Assignee: C. & E. Fein GmbH & Co., Stuttgart (DE)

( * ) Notice: Subject to any disclaimer, the term of this patent is extended or adjusted under 35 U.S.C. 154(b) by 0 days.

(21) Appl. No.: 09/461,256

(22) Filed: Dec. 15, 1999

(30) Foreign Application Priority Data

Dec. 31, 1998 (DE) ............................................... 198 60 847
Jan. 8, 1999 (DE) ............................................... 199 00 402

(51) Int. Cl.$^7$ ................................................... B24B 23/02
(52) U.S. Cl. ........................ 451/344; 451/358; 451/359; 451/360
(58) Field of Search ..................................... 451/344, 342, 451/354, 358, 359, 360, 363; 30/517, 518; 173/170; 16/110 R

(56) References Cited

U.S. PATENT DOCUMENTS

| | | | |
|---|---|---|---|
| 5,065,476 | 11/1991 | Dohse et al. | |
| 5,201,146 | * 4/1993 | Fushiya | 451/358 |
| 5,339,572 | * 8/1994 | Eicher | 451/358 |
| 5,407,381 | * 4/1995 | Schaefer et al. | 451/358 |
| 5,681,214 | 10/1997 | Kleider et al. | |

FOREIGN PATENT DOCUMENTS

| | | |
|---|---|---|
| 4021 277 | 3/1991 | (DE) . |
| 9 319 263 U1 | 4/1994 | (DE) . |
| 195 32 299 A1 | 6/1997 | (DE) . |
| 195 46 328 A1 | 6/1997 | (DE) . |

* cited by examiner

Primary Examiner—Joseph J. Hail, III
Assistant Examiner—George Nguyen
(74) Attorney, Agent, or Firm—Cummings & Lockwood

(57) ABSTRACT

A power tool is disclosed, having an elongated motor housing in which an electric motor is received, having a gear drive housing at a first end of the motor housing to receive a gear drive for driving a working spindle, and having a handle element which is fastened rotatably at a second end of the motor housing and in which a grip switch is arranged. The handle element is rotatable with respect to the motor housing into at least four predefined angular positions that are preferably offset from one another by angles of 90°, and can be snap-locked in them.

13 Claims, 3 Drawing Sheets

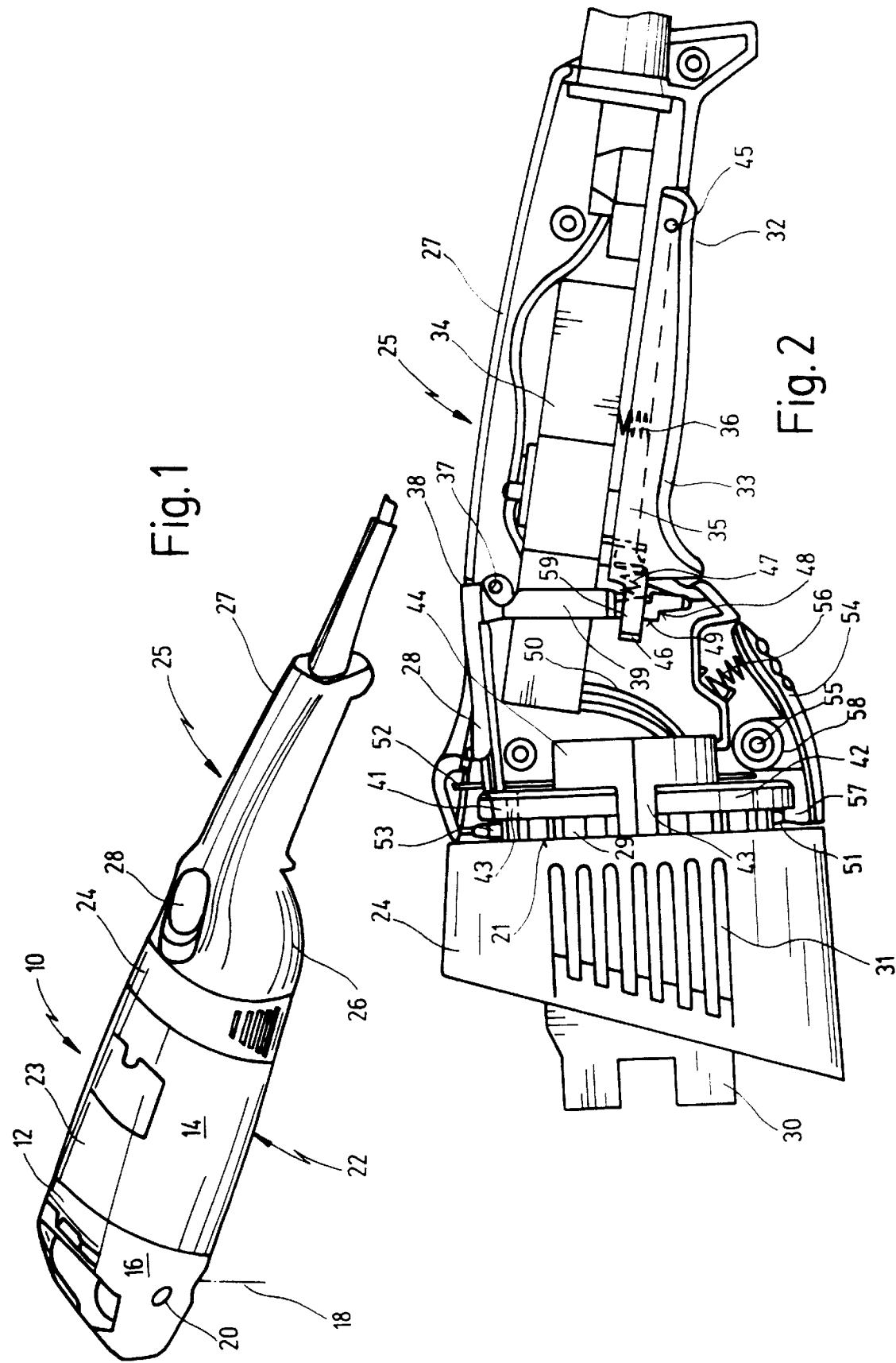

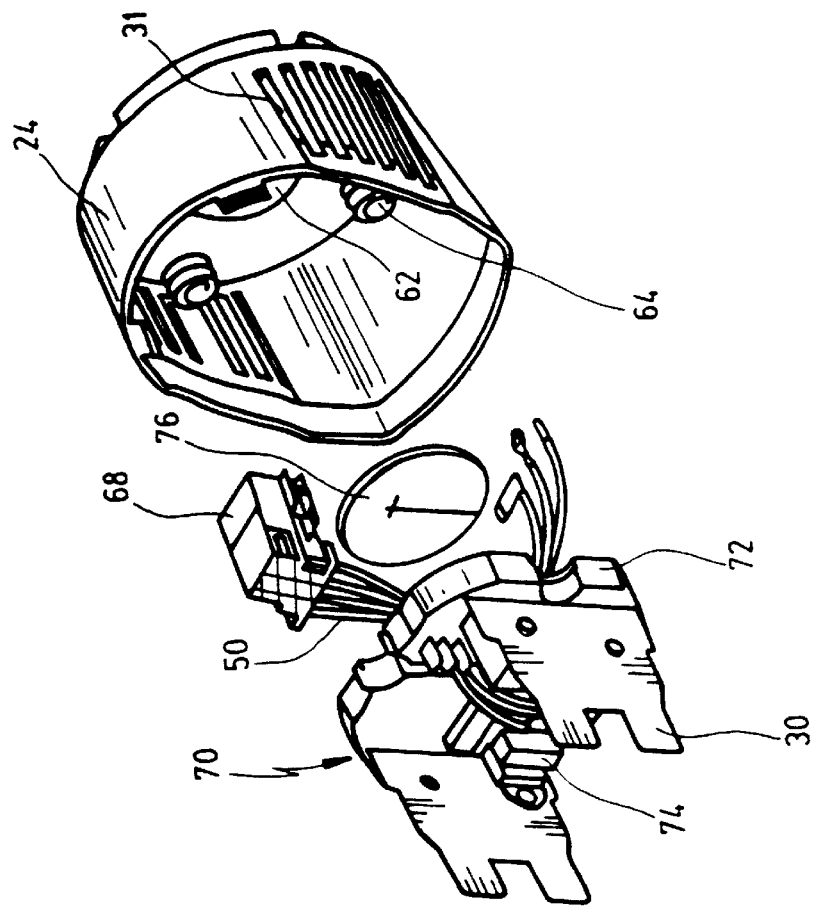
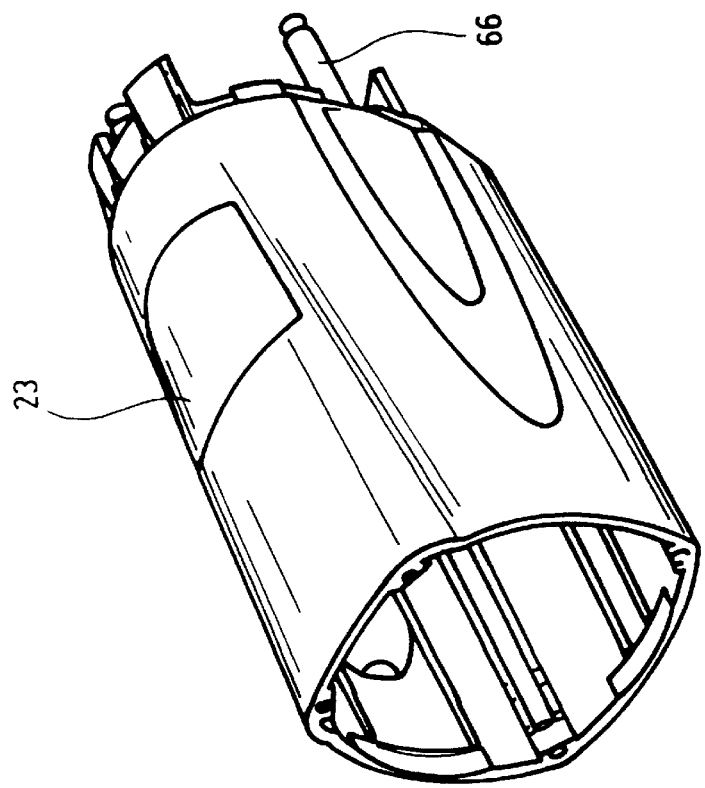
Fig.5

ELECTRIC POWER TOOL WITH ROTATABLE HANDLE

BACKGROUND OF THE INVENTION

The present invention relates to a power tool, in particular a right-angle grinder, having an elongated motor housing in which an electric motor is received, having a gear drive housing at a first end of the motor housing to receive a gear drive for driving a working spindle, and having a handle element which is fastened rotatably at a second end of the motor housing and in which a grip switch is arranged.

A power tool of this kind is known from DE 195 46 328 A1.

The known power tool is configured as a right-angle grinder, and has a yoke-shaped handle element, having a grip switch, that is fastened rotatably at the end of a motor housing and is rotatable with respect to the motor housing into a total of three angular positions, each offset 90° from one another. This makes it possible for both right-handers and left-handers to hold the right-angle grinder in a particularly ergonomic fashion, if it is considered that in the front region of the motor housing, a second handle of rod-shaped configuration can additionally be threaded onto the housing, selectably on the right or left. A rotation capability of this kind further makes it possible to alternate the right-angle grinder between cutoff grinding and rough grinding; in the case of cutoff grinding, it is possible to work selectably either with a grinding spindle projecting to the right out of the gear drive head, or with a grinding spindle projecting to the left out of the gear drive head.

For immobilization in the various angular positions, recesses into which a locking element, preloaded in the axial direction, engages are provided at the end of the motor housing facing toward the handle element. When the handle element is to be rotated out of one angular position into another angular position, a handle must first be actuated in order to release the locking element in the axial direction, against the spring tension, out of the relevant recess, so that the handle element can be rotated until the locking element snaps back into a projection in the next predefined angular position.

In a further power tool that is known from DE 40 21 277 A1 and can be used as a cutoff grinder, hedge clipper, brush cutter, or motor-driven chain saw, a yoke-shaped handle at the end of a motor housing is also adjustable into three different angular positions offset 90° from one another, into which it can snap. Provided for snap-locking is a catch pawl, mounted on the handle, that engages with a projection into a corresponding depression of the motor housing and is loaded by a spring in the direction of an immobilization position.

SUMMARY OF THE INVENTION

It is the object of the invention to create an improved power tool such that the disadvantages of the existing art are avoided and ergonomic operation, with the widest possible working range, is made possible.

In a power tool of the kind defined initially, this object is achieved according to the present invention in that the handle element is rotatable with respect to the motor housing into at least four predefined angular positions and can be snap-locked in them.

The object of the invention is completely achieved in this fashion. The present invention overcomes the prejudice, existing in the related art, that it is sufficient for all applications to rotate a rotatable handle element with respect to the motor housing from a center position into one further working position to the left or into one other working position to the right. The present invention, specifically, now makes possible a further working position in which the handle element can be rotated, for example, 180° with respect to its normal position, while two further working positions are possible in which a rotation out of the normal position takes place only 90° clockwise or counterclockwise, respectively.

These additional angular positions facilitate work, in particular, on ceiling areas. Roughing work on ceiling areas occurs, for example, in rail car construction. In this, the right-angle grinder must be held above the head so that parts can be deburred or the like. The present invention greatly facilitates such work, since the handle element can be rotated 180° with respect to its normal position. Further advantages are offered when the right-angle grinder is used in stationary fashion.

In an additional development of the invention, a rotation angle limiter is provided between the motor housing and handle element to limit the maximum rotation angle between the motor housing and the handle element.

This feature prevents the handle element from being rotated several times with respect to the motor housing, which might result in damage to the electrical connecting lines between the handle element and motor housing.

In an advantageous development of the invention, the grip switch has a grip button that is locked to prevent actuation if the handle element is not in one of the predefined angular positions and snap-locked to the motor housing.

This prevents the power tool from being switched on if the handle element is not in a stable position with reference to the motor housing, thus preventing inadvertent rotation of the handle element with respect to the motor housing while working, with the associated risk of accident.

According to a further embodiment of the invention, there is provided on the motor housing a central annular flange in which radial recesses are provided into which a projection of a locking lever, mounted pivotably and preloaded into an immobilization position, can snap-lock in each of the respective predefined angular positions.

This results in a particularly simple immobilization capability for the handle element in the predefined angular positions on the motor housing, and moreover yields a particularly space-saving construction. The result is to prevent the handle element from rotating unintentionally. If a rotation of the handle element into a different angular position with respect to the motor housing is desired, it is instead necessary first to press down the locking button, whereupon the handle element can then be rotated with respect to the motor housing until the locking button once again engages, in one of the predefined angular positions, into one of the radial recesses on the motor housing and locks the handle element to prevent further rotation with respect to the motor housing.

In an additional development of the invention, there is additionally fastened on the handle element, pivotably on a pivot shaft, an immobilization lever that has a first part, protruding from the pivot shaft toward the motor housing and configured as a pushbutton, at whose outer end is configured a projection that can be introduced into one of the recesses of the flange; and that has a second part, protruding from the pivot shaft approximately at right angles to the first part, that coacts with the grip button of the grip switch in such a way that the grip button can be pushed in to switch on the motor only if the pushbutton has previously been transferred into an activation position by being pressed in, so that the projection of the immobilization lever engages into one of the radial recesses on the annular flange of the motor housing.

In this fashion, unintentional activation of the right-angle grinder when the grip switch is grasped is avoided with simple means. A user must first push down the pushbutton before he or she can actuate the grip button of the grip switch.

In an additional development of this embodiment, the grip button is fastened pivotably at the end of the handle element facing away from the motor housing and preloaded against a movement into an activation position to switch on the motor, and has at its free end a web that, in a catch position when the pushbutton is not pushed in, stops against a projection on the second part of the immobilization lever so as to prevent actuation of the grip button to switch on the motor.

In an additional development of this embodiment, when the pushbutton is pushed in, the grip button is movable against a spring force past the projection into the activation position in order to switch on the electric motor, the web on the grip button coacting with the second part of the immobilization lever in order to prevent the latter from moving out of the activation position of the pushbutton.

This ensures that the pushbutton needs to be pushed in only once as work begins, and then, once the grip switch has been actuated, the pushbutton remains in its activation position, resulting in a continuous operation position. When the grip button is then released, the immobilization lever then allows the grip button to disengage so that thereafter the pushbutton must first be pressed again before the grip switch can be reactivated.

According to a further embodiment of the invention, the motor housing has, on its side facing toward the handle element, a central cylindrical stem having a leadthrough for the passage of cables that passes through the annular flange; inwardly protruding webs, which are guided on the outer surface of the stem and in a cavity between the annular flange and an end face of the motor housing, are provided on the handle element.

This feature guarantees good guidance of the handle element on the motor housing, and ensures easy rotatability with little friction. Simple and economical producibility is also ensured, especially if the handle element comprises two housing shells that can be assembled.

In an additional development of the invention, the handle element has no ventilation slots.

This has the advantage that the sensitive grip switch is not exposed to any contamination due to the penetration of dirt particles. Ventilation slots can instead be provided, for example, in the motor housing.

It is understood that the features mentioned above and those yet to be explained below can be used not only in the respective combinations indicated, but also in other combinations or in isolation, without leaving the context of the present invention.

SHORT DESCRIPTION OF THE DRAWINGS

Exemplary embodiments of the invention are shown in the drawings and explained in more detail in the description which follows. In the drawings:

FIG. 1 shows a perspective view of a power tool according to the present invention, using the example of a right angle grinder;

FIG. 2 shows a view of the power tool as shown in FIG. 1, on which only the handle element and the end of the motor housing facing toward the handle element are visible, one housing half of the handle element having been removed;

FIG. 5 shows an exploded representation of the motor housing with the front motor housing part, rear motor housing part, and an insert element for the rear motor housing part with accessories.

DETAILED DESCRIPTION OF THE PREFERRED EMBODIMENT

Figure 3:
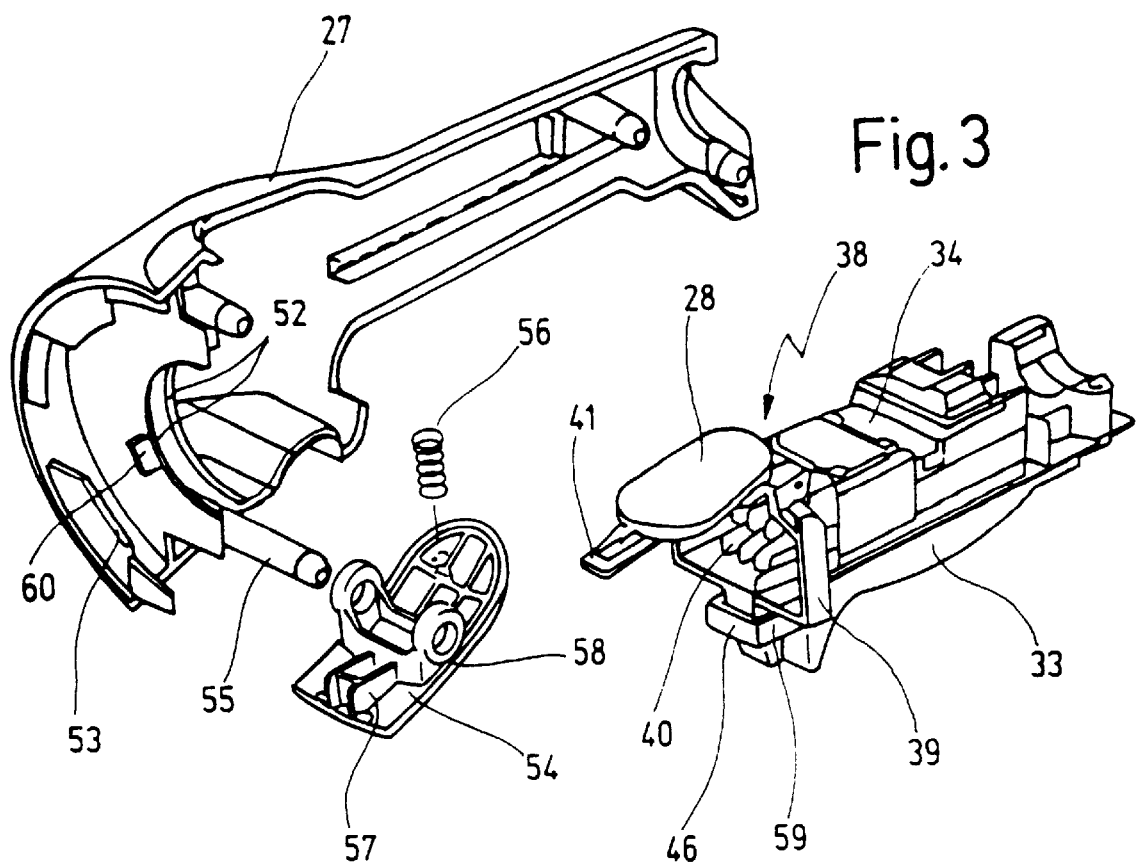
FIG. 3 shows an exploded view of the right-hand housing half of the handle element with the locking button and associated spring, and of the grip switch that is assembled with the immobilization lever into one unit.

In FIG. 1, a power tool according to the present invention is shown in perspective and labeled in its entirety with the number 10. Power tool 10 that is shown is a right-angle grinder, embodied as a so-called two-handed right-angle grinder and having at its rear end a handle element, labeled in its entirety with the number 25, in which a grip switch is provided (cf. FIG. 2). A pushbutton 28, whose function will be explained in more detail below, is provided at the upper end of the handle element.

Power tool 10 furthermore comprises a motor housing, labeled in its entirety with the number 22, that has a front motor housing part 23 to receive an electric motor 14, as well as a rear motor housing part 24 that is adjoined by handle element 25. Adjoining front motor housing part 23 is a gear drive housing 12 in which a gear drive 16 is provided to drive a working spindle that is indicated only schematically with the number 18. Also shown, on the left-hand side of gear drive housing 12, is a receptacle 20 into which a rod-shaped additional handle can be threaded, so that power tool 10 can be held with a front hand on the additional handle and a rear hand on handle element 25. It is understood that a further receptacle for the additional handle is provided on the opposite, right-hand side of gear drive housing 12, so that power tool 10 is suitable alternatively for right-handed or left-handed operation.

In FIG. 1, the safety shroud that is always provided on a right-angle grinder is not shown for the sake of clarity.

Handle element 25 has a first, left-hand handle housing part 26 and a second, right-hand handle housing part 27, the functions of which will be explained in more detail below.

Handle part 25 can be rotated twice to the left (i.e. counterclockwise), through an angle of 90° each time, from the basic position shown in FIG. 1 in which grip button 33 as shown in FIG. 2 faces downward, and once to the right (i.e. clockwise), through 90°, from the basic position shown in FIG. 1.

This rotation capability makes it possible to switch over between rough grinding, in which a surface is processed in planar fashion with a grinding disk, and cutting, in which a workpiece is cut through with the end surface of a cutoff disk. In addition, because handle element 25 can be rotated 2×90° (i.e. 180°) in one direction, the grip switch can also be rotated onto the upper side of power tool 10. A handle position of this kind is advantageous in particular for rough grinding on ceilings and overhead projections.

The rotation mechanism that makes it possible for handle element 25 to rotate with respect to motor housing 22 and to snap into place in the predefined angular positions is described in more detail below with reference to FIGS. 2 through 4.

In FIG. 2, handle part 25 is shown in an enlarged view together with rear motor housing part 24, left-hand handle housing part 26 having been removed so that the internal configuration, which is shown in somewhat simplified fashion, is visible.

Rear motor housing part 24 has an approximately circular cross section (cf. FIG. 4), and at its front end, which can be fitted together with front motor housing part 23, is cut off obliquely downward, yielding approximately an oblique truncated cone. A plurality of air intake slots 31 are arranged laterally, one above another, on both sides of rear motor housing part 24; and baffle plates 30, whose front ends are visible in FIG. 2 projecting forward out of rear motor housing part 24, are arranged respectively inside rear motor housing part 24 at a small distance from air intake slots 31. The function of these baffle plates 30 will be explained in further detail below.

Rear motor housing part 24 has a central cylindrical stem 44 that projects into handle part 25. This stem 44 serves as a leadthrough 62 (cf. FIG. 4) for the passage of electrical cables 50 between the motor housing and the handle part, and serves also as a rotary bearing for rotatable reception of handle part 25 on rear motor housing part 24. Rear motor housing part 24 has an end surface 21, facing toward handle part 25, to which an annular flange 42 is joined via radially extending webs 29, forming a cavity 51. This annular flange 42 has an outside diameter somewhat smaller than that of rear motor housing part 24 at its end surface, but possesses a much greater diameter than stem 44 which is coaxial therewith.

Figure 4:
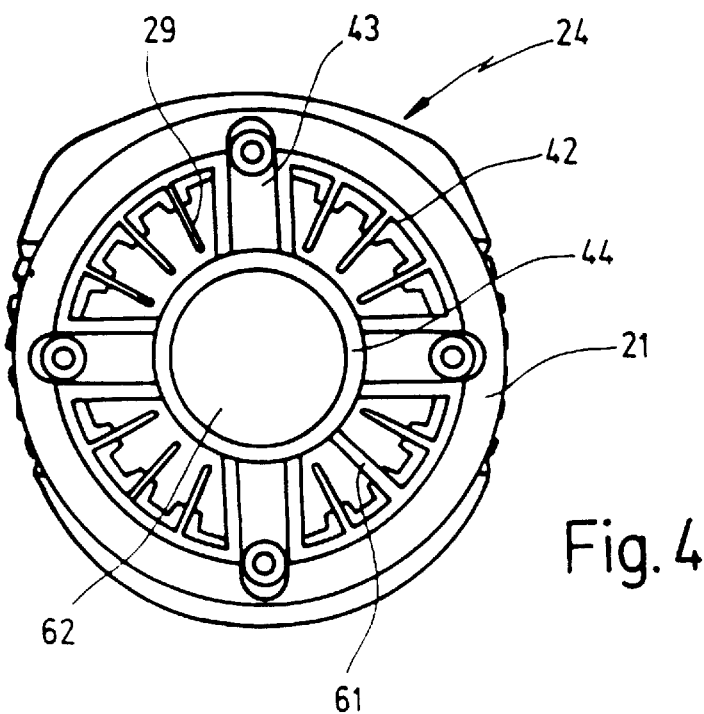
FIG. 4 shows a view of the motor housing from the handle element.

Annular flange 42 has a total of four radial recesses 43 that are each offset by an angle of 90° from one another (cf. FIG. 4).

At these recesses 43, handle part 25 can be snap-locked to rear motor housing part 24, in the angular positions predefined by recesses 43, with the aid of a locking lever 54.

Also provided is an immobilization lever 38 that is received pivotably on a pivot shaft 37 and has, as the first part protruding forward from pivot shaft 37 toward gear drive housing 12, pushbutton 28 on whose front end is shaped a projection 41 that, when aligned with a recess 43, can be introduced thereinto. Immobilization lever 38 furthermore has a second part, joined rigidly to pushbutton 28, that projects downward approximately at right angles to pushbutton 28 and, at its lower end, coacts with grip switch 32.

Grip switch 32 has a grip button 33 that is fastened at the rear lower end of handle element 25 pivotably about a pivot shaft 45. Grip button 33 coacts with a switch module 34 that is arranged above grip button 33, grip button 33 being preloaded downward by a spring 36 and, when moved upward toward a switching pin 35 arranged on the underside of switch module 34, acting to switch electric motor 14 on and off.

Grip button 33 has on its front end, facing toward rear motor housing part 24, an extension 59 on the left and on the right side; these are joined to one another at the outer end by a crosspiece 46, thus forming overall, at the front end of grip button 43, an approximately rectangular opening in which the lower end of second part 39 of immobilization lever 38 is movable to a certain degree.

At its lower end, second part 39 of immobilization lever 38 has a projection 48 that serves as the stop for crosspiece 46 of grip button 33.

Immobilization lever 38 is preloaded, by a spring 47 that acts on second part 39, in such a way that immobilization lever 38 is acted upon clockwise (in the representation of FIG. 2) so that pushbutton 28 is preloaded upward.

In the position shown in FIG. 2, projection 41 of pushbutton 28 aligns with one of recesses 43, so that pushbutton 28 could be transferred into the activation position shown simply by being pushed in. When pushbutton 28 was pushed in, grip button 33 with its crosspiece 46 was moved past projection 48 of second part 39 of the immobilization lever, against the force of spring 36, so as thereby to actuate switch module 34 in order to switch on power tool 10.

Once this position has been reached, pushbutton 28 can be released, since immobilization lever 38 is prevented from pivoting back out of its activation position into its rest position, in response to the force of spring 47, by the fact that a front surface 49 of second part 39 of immobilization lever 38 comes to a stop from the inside against crosspiece 46 of grip button 33.

The result is thus a continuous operation position in which grip button 33 simply needs to be continuously grasped in order to allow continuous operation with power tool 10.

If grip button 33 is then released from this position shown in FIG. 2, grip button 33 then moves downward in response to spring 36 so that its crosspiece 46 is moved past projection 48 of second part 39 of immobilization lever 38, and immobilization lever 38 is then pivoted out of its activation position, in response to spring 47, into its rest position or starting position. Once this position has been assumed, grip button 33 can no longer be moved upward, since crosspiece 46 is stopped against projection 48 of second part 39 of immobilization lever 38.

When the motor is to be switched on, pushbutton 28 therefore must first be pressed, causing immobilization lever 38 to pivot counterclockwise (as shown in FIG. 2) so that grip button 33 with its crosspiece 46 can now be pivoted upward past projection 48 in order to actuate switching pin 35 of switch module 34.

Also visible in FIG. 2 at the lower end of handle element 25 is locking lever 54, which is received with a receptacle 58 pivotably on a pivot shaft 55 of the second or right-hand handle housing part 27 (cf. also FIG. 3). This locking lever 54 is preloaded by a spring 56 in such a way that when handle element 25 is aligned with one of the radial recesses 43, it can engage with a projection 57 into the relevant recess 43 on rear motor housing part 24, and handle element 25 can thus be prevented from rotating with respect to rear motor housing part 24.

The effect of locking lever 54 is to make any rotation of handle element 25 with respect to motor housing 22 possible only if locking handle 54 is deliberately pressed. Handle element 25 can then be rotated until, after a rotation through 90° or a multiple thereof, locking lever 54 is once again aligned with a radial recess 43 of annular flange 42, and projection 57 of locking lever 54, in response to spring 56, engages with its projection 57 into radial recess 43 of annular flange 42 and locks handle element 25 against any further rotation. The function such that handle element 25 is locked in a predefined angular position on motor housing 22 is thus decoupled from the function of pushbutton 28, which serves as an activation lock to prevent the electric motor from being switched on unintentionally, but uses for snap-locking purposes the same radial recess 43 as locking lever 54.

Handle element 25 is guided on the one hand on stem 44 by webs 52, 53 projecting inward from the two handle housing parts 26, 27, and on the other hand on annular flange 42. As is evident from FIG. 3, right-hand handle housing part 27 has two mutually parallel annular webs 52 that effect a first guidance on the surface of stem 44, and also has on its end facing toward rear motor housing part 24 a plurality of annular web segments 53, running in the circumferential direction, that engage into the cavity 51 between end face 21 and annular flange 42.

Since annular flange 42 is joined via individual radially extending ribs 29 to end face 21 of rear motor housing part 24, the result is thus a decreased contact surface for webs 53 and, in combination with webs 52 which run parallel to one another and rest on stem 44, extremely reliable rotary guidance for handle element 25 on rear motor housing part 24, but with a relatively low frictional resistance.

Also provided, between handle element 25 and rear motor housing part 24, is a rotation angle limiter that is constituted by a projection 60 on right-hand handle housing part 27 (cf. FIG. 3) and by a radial rib 61 (cf. FIG. 4) on rear motor housing part 24 that extends between stem 44 and the outer rim of annular flange 42. Handle part 25 is thereby prevented from rotating 360° or more in one direction.

Front motor housing 23, rear motor housing part 24, and an insert element 70, with accessories, that can be slid into rear motor housing part 24 are shown in FIG. 5 in an exploded view and are explained in more detail below.

Front motor housing part 23 serves to receive electric motor 14. Rear motor housing part 24, on the other hand, receives insert element 70, which comprises a baseplate 72, extending over the cross section of motor housing part 24, on which electronic components 74 for controlling power tool 10 are encapsulated and on whose left side and right side a respective baffle plate 30 made of sheet aluminum projects forward.

When power tool 10 is operated, cooling air is drawn in through air slots 31 on both sides of rear motor housing part 24; it first strikes baffle plates 30 arranged directly behind air intake slots 31, causing the deflection of dust particles and other contaminants that might also be drawn in when working in a highly contaminated environment. (The air emerges again through air slots (not shown) in the region of gear drive housing 12.) This arrangement has an advantageous effect on the service life of electric motor 14. Baffle plates 30 are moreover simultaneously configured as cooling elements for some of the electronic components 74, so that they are additionally cooled by the drawn-in air flow. This contributes to the operating reliability of electronic components 74.

Whereas in conventional right-angle grinders the air intake slots were previously located in handle element 25, i.e. in the immediate vicinity of grip switch 32, air intake slots 31 are now provided in rear motor housing part 24 in a manner separated in terms of flow engineering from handle part 25. Leadthrough 62 for cables 50, which are equipped with a plug connector 68 for connecting to corresponding connector pins 40 on switch module 34 (cf. FIG. 3), are largely closed off by baseplate 72 of insert element 70. In addition, a flexible sealing disk 76, which is slid onto cables 50 and is located together with them inside leadthrough 62 of stem 44, is provided in order to seal them additionally even when handle part 25 is rotated.

This prevents contaminated air from ending up in the vicinity of grip switch 32 and thus prematurely degrading its functionality.

Production and assembly are considerably simplified by the fact that motor housing 22 is configured in two parts with a front motor housing part 23 and rear motor housing part 24. Insert element 70, with electronic components 74 and baffle plates 30, is inserted into rear motor housing part 24, while electric motor 14 is installed in front motor housing part 23; then the two components are immovably joined to one another by threading screws, located in screw holes 64 in rear motor housing part 24, into screw receptacles 66 in the form of pegs on front motor housing part 23.

What is claimed is:

1. An electric power tool comprising:
an elongated motor housing having a first end and a second end;
a gear drive housing attached to said first end of said motor housing;
a handle element received at the second end of said motor housing and being rotatable with respect to said motor housing into at least four predefined angular positions, said handle element having a first end facing said motor housing and a second end opposite thereto;
locking means for positively locking said handle element within said predefined angular positions and for controlling switching of the electric power tool;
an electric motor received within said motor housing;
a gear drive received within said gear drive housing and being driven by said electric motor;
a working spindle driven by said gear drive; and
a grip switch arranged on said handle element for providing electric power supply to said electric motor;
wherein the predefined angular positions are each offset from one another by a rotation angle of 90°.

2. The power tool as defined in claim 1, wherein the handle element is adapted for rotation, by 90 degrees in one direction of rotation from a first predefined position into a second predefined position, by 90 degrees in a second direction of rotation from said first predefined position into a third predefined position, and by 90 degrees in said second direction of rotation from said third predefined position into a forth predefined position.

3. The power tool as defined in claim 1, further comprising a rotation angle limiter provided between the motor housing and the handle element for limiting the maximum rotation angle between said motor housing and said handle element.

4. The power tool as defined in claim 1, wherein ventilation slots are provided on said motor housing in a region adjoing the second end thereof.

5. An electric power tool comprising:
an elongated motor housing having a first end and a second end;
a gear drive housing attached to said first end of said motor housing;
a handle element received at the second end of said motor housing and being rotatable with respect to said motor housing into at least four predefined angular positions and into intermediate angular positions between said predefined angular positions, said handle element having a first end facing said motor housing and a second end opposite thereto;
locking means for locking said handle element within said predefined angular positions and for controlling switching of the electric power tool;
an electric motor received within said motor housing;
a gear drive received within said gear drive housing and being driven by said electric motor;
a working spindle driven by said gear drive; and
a grip switch arranged on said handle element for providing electric power supply to said electric motor;

wherein the grip switch comprises a grip button interacting with said locking means for locking said grip switch against activation when being in any of said intermediate angular positions with respect to said motor housing.

6. The power tool as defined in claim 5, wherein the motor housing comprises a central annular flange having a plurality of radial recesses, wherein the handle element further comprises a locking lever having a projection, said locking lever being mounted pivotably about a pivot axis, and spring means is provided for preloading said locking lever for engaging one of said radial recesses with its projection when being in one of said predefined angular positions, thereby snap-locking said handle element against rotation when being in one of said predefined angular positions.

7. The power tool as defined in claim 6, wherein said handle element further comprises an immobilization lever arranged pivotably about a pivot shaft, said immobilization lever having a first part, protruding from the pivot shaft toward the motor housing and being configured as a pushbutton and having a projection at an outer end thereof, said projection adapted for snap-locking into one of said radial recesses; said immobilization lever having a second part protruding from the pivot shaft approximately at right angle to the first part and coacting with a grip button provided on said grip switch so as to allow actuation of the grip button for switching on the electric motor only when the pushbutton is in an activation position in which the projection of the immobilization lever engages into one of the radial recesses of said annular flange.

8. The power tool as defined in claim 7, wherein the grip button is arranged pivotably at said second end of said handle element and spring means is provided for preloading said grip button against movement into an activation position for activating said electric motor.

9. The power tool as defined in claim 8, wherein said grip button further comprises a web at a free end opposite said pivot axis, said web, when in a catch position when the pushbutton is not pushed in, stopping against a projection provided on the second part of the immobilization lever so as to prevent actuation of the grip button for switching on the electric motor.

10. The power tool as defined in claim 9, further comprising spring means for preloading said grip button against movement past the projection into an activation position, when said pushbutton is in said activation position, for switching on the electric motor, wherein said web on said grip button coacts with said second part of said immobilization lever in order to prevent the latter from moving out of the activation position of the pushbutton.

11. The power tool as defined in claim 6, wherein the motor housing comprises a central cylindrical stem at its second end, said stem having a leadthrough for the passage of cables that passes through said annular flange.

12. The power tool as defined in claim 6, wherein and wherein said handle element further comprises inwardly protruding annular webs, which are guided on an outer surface of the stem and in a cavity provided between said annular flange and an end face of said motor housing.

13. An electric power tool comprising:

an elongated motor housing having a first end and a second end;

a gear drive housing attached to said first end of said motor housing;

a handle element received at the second end of said motor housing and being rotatable with respect to said motor housing into at least four predefined angular positions, said handle element having a first end facing said motor housing and a second end opposite thereto;

a flange member provided on said motor housing having recesses at said four predefined angular positions;

locking means provided on said handle element for positively engaging one of said recesses when being within one of said predefined angular positions, thereby locking said handle element against rotation;

an electric motor received within said motor housing;

a gear drive received within said gear drive housing and being driven by said electric motor;

a working spindle driven by said gear drive; and a grip switch arranged on said handle element for providing electric power supply to said electric motor, wherein the locking means interacts with the grip switch to prevent activation of the electric power tool when one of said recesses is not engaged.

* * * * *